(12) United States Patent
Mayr et al.

(10) Patent No.: US 9,157,539 B2
(45) Date of Patent: Oct. 13, 2015

(54) PRESSURE CONTROL VALVE DEVICE

(71) Applicant: ZF Friedrichshafen AG, Friedrichshafen (DE)

(72) Inventors: Karlheinz Mayr, Bregenz (AT); Markus Moosmann, Gruenkraut (DE); Frank Hamma, Oberteuringen (DE); Hubert Remmlinger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 247 days.

(21) Appl. No.: 13/685,819

(22) Filed: Nov. 27, 2012

(65) Prior Publication Data
US 2013/0133767 A1    May 30, 2013

(30) Foreign Application Priority Data
Nov. 29, 2011   (DE) .......................... 10 2011 087 264

(51) Int. Cl.
*F16K 31/02* (2006.01)
*F16K 17/00* (2006.01)
*G05D 16/20* (2006.01)

(52) U.S. Cl.
CPC ............. *F16K 17/00* (2013.01); *G05D 16/2013* (2013.01); *Y10T 137/87217* (2015.04)

(58) Field of Classification Search
CPC ....... F16K 17/00; F16K 47/12; F16K 31/265; G05D 16/2013; Y10T 137/87217; Y10T 137/86678; Y10T 137/6307
USPC .......................... 137/596.17, 14, 625.26, 332; 251/129.15, 126
See application file for complete search history.

(56) References Cited

U.S. PATENT DOCUMENTS

| 1,759,081 | A | * | 5/1930 | Anderson ..................... 137/331 |
| 4,921,215 | A | | 5/1990 | Fujiwara |
| 4,936,342 | A | | 6/1990 | Kojima et al. |

(Continued)

FOREIGN PATENT DOCUMENTS

| DE | 36 36 348 A1 | 5/1987 |
| DE | 39 02 446 A1 | 8/1989 |

(Continued)

OTHER PUBLICATIONS

German Search Report Corresponding to DE 10 2011 087 264.7.

(Continued)

*Primary Examiner* — Craig Schneider
*Assistant Examiner* — Minh Le
(74) *Attorney, Agent, or Firm* — Davis & Bujold, P.L.L.C.; Michael J. Bujold

(57) ABSTRACT

A pressure-control valve device for a fluid, having at least one inlet area and first and second outlet areas that can be flow-connected to one another by two seat valves coupled to one another, in which a fluid flow from the inlet area to the first and second outlet areas can be adjusted by the first seat valve and a fluid flow between the first and second outlet areas can be adjusted by the second seat valve. The first seat valve is designed as a valve aperture with a valve opening and a valve control edge and with a ball-shaped closing element that co-operates with the valve control edge. The valve opening and the ball-shaped closing element are designed such that the ratio of the diameter of the valve opening to the diameter of the ball-shaped closing element is equal to at least 0.75.

11 Claims, 5 Drawing Sheets

(56) References Cited

U.S. PATENT DOCUMENTS

| | | | |
|---|---|---|---|
| 5,251,444 | A | 10/1993 | Ochiai et al. |
| 6,719,006 | B2 * | 4/2004 | Fleischer et al. ......... 137/596.17 |
| 6,904,934 | B2 | 6/2005 | Runge et al. |
| 7,516,756 | B2 | 4/2009 | Mayr et al. |
| 7,905,249 | B2 * | 3/2011 | Mayr et al. ............... 137/596.17 |
| 7,984,729 | B2 * | 7/2011 | Mayr ...................... 137/596.17 |
| 8,701,707 | B2 * | 4/2014 | Moosmann et al. ..... 137/596.17 |
| 2002/0053362 | A1 * | 5/2002 | Frei et al. ................. 137/596.17 |
| 2003/0037825 | A1 * | 2/2003 | Runge et al. ............. 137/596.17 |
| 2003/0136449 | A1 * | 7/2003 | Boddy ..................... 137/596.17 |
| 2004/0089353 | A1 * | 5/2004 | Soga et al. ............... 137/596.17 |
| 2005/0034769 | A1 * | 2/2005 | Moreno et al. ........... 137/596.17 |
| 2005/0067028 | A1 * | 3/2005 | Ryuen et al. ............. 137/596.17 |
| 2005/0284524 | A1 | 12/2005 | Uryu et al. |
| 2006/0272714 | A1 * | 12/2006 | Carrillo et al. ........... 137/596.17 |
| 2010/0276022 | A1 | 11/2010 | Moosmann et al. |
| 2012/0167991 | A1 * | 7/2012 | Feilner .............................. 137/1 |
| 2012/0298903 | A1 * | 11/2012 | Scherer et al. ................ 251/333 |
| 2014/0150908 | A1 | 6/2014 | Mayr et al. |

FOREIGN PATENT DOCUMENTS

| | | |
|---|---|---|
| DE | 198 27 281 C1 | 1/2000 |
| DE | 100 34 959 A1 | 2/2002 |
| DE | 10 2005 021 902 A1 | 11/2006 |
| DE | 10 2008 000 106 A1 | 7/2009 |
| WO | 92/01163 A1 | 1/1992 |
| WO | 2005/026858 A1 | 3/2005 |
| WO | 2009/092488 A1 | 7/2009 |

OTHER PUBLICATIONS

German Search Report Corresponding to 10 2011 079 366.6 mailed Jun. 20, 2012.
International Search Report Corresponding to PCT/EP2012/061322 mailed Sep. 26, 2012.
Written Opinion Corresponding to PCT/EP2012/061322 mailed Sep. 26, 2012.
International Preliminary Report on Patentability Corresponding to PCT/EP2012/061322 mailed Nov. 22, 2012.

* cited by examiner

PRESSURE CONTROL VALVE DEVICE

This application claims priority from German patent application serial no. 10 2011 087 264.7 filed Nov. 29, 2011.

FIELD OF THE INVENTION

The invention relates to a pressure-control valve device for a fluid.

BACKGROUND OF THE INVENTION

In multi-stage motor vehicle automatic transmissions known from current practice shifting elements designed as wet-operating clutches or brakes are used between a transmission input shaft and a transmission output shaft of the automatic transmission for engaging various gear steps. For this, depending on the gear step desired, opening or closing of the shifting elements takes place. The pressure force required for this is usually applied for each shifting element by a hydraulically actuated clutch piston, which is supplied with hydraulic fluid by way of shifting element valves also known as pressure-reducing valves. These pressure-reducing valves are either themselves designed as proportional pressure-control valves or they are actuated by a hydraulic pilot control system such that the hydraulic pressure required for the pilot control is again set by a proportional pressure-control valve. In such a proportional pressure-control valve, as a function of an energizing current a magnetic force is produced, depending on which a certain, predictable working pressure is set at the valve. That pressure can be measured in an outlet area of the valve and is determined by the ratio between the magnetic force (action force) and a return force directed in opposition to the magnetic force (reaction force).

Proportional pressure-control valves common nowadays, for example the one disclosed in WO 2005/026858 A1, have two seat valves coupled in a hydraulic semi-bridge circuit, i.e. they have an inlet area and two outlet areas such that in terms of the flow a first seat valve is arranged between the inlet area and the first outlet area and a second seat valve is arranged between the first outlet area and the second outlet area. In this case the seat valves are designed, and their closing elements are coupled with one another, in such manner that in their end positions the closing elements close or open the seat valves in alternation.

To reduce the flow resistance and increase the dynamic controllability of a transmission shifting element controlled by the pressure-control valve, in WO 2005/026858 A1 it is proposed to insert between the first and second outlet areas a flow guiding device, specifically a stream deflector, which deflects a fluid flow from the first to the second seat valve by less than 30°.

From WO 2009/092488 A1 it is also known to provide such a flow guiding device with a plurality of duct areas in such manner that fluid flowing in the direction of the second seat valve has imparted to it a twisting motion, whereby the valve dynamics are improved and the valve leakage is reduced.

Furthermore, DE 100 34 959 A1 shows and describes a proportional pressure-control valve comprising a valve portion with inlet and outlet openings and at least one closing element for controlling an aperture, and a magnetic portion with a magnet core, a solenoid and a movable magnet armature. An actuator co-operates with the armature, the actuator actuating the ball-type closing element so that the hydraulically effective cross-section of an aperture is determined essentially by the aperture length, the aperture diameter and the diameter of the part of the actuator that penetrates into the aperture. In this proportional pressure-control valve the ratio of the aperture length to the aperture diameter should be <2.0.

This achieves better hydraulic properties of a proportional pressure-control valve, in particular a valve with optimized through-flow which, especially in the range of lower temperatures, i.e. when the viscosity of the hydraulic fluid is greater, shows substantially lower flow resistances. Correspondingly, the inlet geometry of the proportional pressure-control valve that determines the through-flow is optimally defined, with a ratio of aperture length to aperture diameter <2.0 and the through-flow determining aperture arranged in the inlet opening of the valve. Advantageously, the result is that the valve concerned has low flow losses, particularly at high oil viscosities, i.e. low temperatures. Moreover higher through-flow quantities and shorter valve response times are obtained, so that a proportional pressure-control valve of this design enables better dynamic values, with advantage.

Despite these design improvements, with these pressure-control valves known from the prior art, on the inlet or outlet side pressure fluctuations, for example produced by pump pressure fluctuations or slip-stick effects in the shifting elements of a vehicle transmission, can act almost without impediment on the closing elements of the seat valves or their operating position, and this makes it difficult to set a working pressure that can be determined at the valve.

In particular, the design principle of seat valves makes a certain inflow pressure dependence unavoidable in practice. This leads to an inlet pressure dependent inaccuracy in the adjustment of the position of the actuating element carrying the closing element of the valve. Especially in the low-load range of a powershift automatic transmission (for example during coasting downshifts) the inflow pressure dependence of such pressure-control valves can be perceived as particularly annoying. This is particularly the case when inflow pressure fluctuations occur in such a load condition, with consequent deviations from the nominal pressure which are amplified by clutch valve transmission ratios to the point that shifting behavior becomes unacceptable. Accordingly there is a need to optimize the behavior of pressure-control valves, particularly at low control pressures and pronounced inlet pressure drops, to the effect that as a result only minimal deviations from nominal pressure occur and the quality of shifts remains virtually uninfluenced by them.

SUMMARY OF THE INVENTION

Thus, the purpose of the present invention is to provide a pressure-control valve device which is less sensitive to pressure fluctuations.

According to these a pressure-control valve device for a fluid is proposed, with at least one inlet area and with a first and a second outlet area, which are in flow connection with one another by way of two seat valves coupled to one another, whereby through the first seat valve a fluid inflow from the inlet area to the first and second outlet areas can be produced and through the second seat valve a fluid outflow between the first and second outlet areas can be produced. In this case the first seat valve is designed as a valve aperture with a valve opening and a valve control edge, and with a ball-shaped closing element that co-operates with the valve control edge. According to the invention, the valve opening and the ball-shaped closing element are designed such that the ratio of the diameter of the valve opening to the diameter of the ball-shaped closing element is at least 0.75 or larger. The valve opening is a circular opening.

In this context circular and ball-shaped are understood to mean that the opening and closing element are essentially of circular and spherical form, respectively. For example, this is the case if their roundness is within the range of typical production tolerances.

Especially in the low-load range of a powershift automatic transmission, for example during coasting downshifts, as described earlier the system-inherent inflow pressure dependence of pressure-control valves is perceived as particularly annoying. This is particularly the case if in such load conditions inflow pressure fluctuations and in particular inflow pressure drops occur so that deviations from nominal pressure are produced, which when amplified by clutch valve transmission ratios give rise to unacceptable shifting behavior. To optimize the behavior of pressure-control valves, particularly at low control pressures and with pronounced inflow pressure drops, in such a way that as a result only minimal deviations from nominal pressure occur and the shifting quality remains virtually uninfluenced by them, it was realized that a given inflow diaphragm geometry, namely the diameter shape, and in particular the size of the closing element, is not free from repercussions owing to flow-contact forces. Thus, there is an influence on the control pressure which depends to some extent on the geometry of the closing element.

It was recognized that the influence on the control pressure described can be minimized if, according to the invention, the ratio of the diameter of the valve opening to the diameter of the closing element ball is at least 0.75 or larger. Of course, within the tolerance ranges for the ball diameter and the valve opening diameter this ratio must remain smaller than 1 so that the closing element can sit securely on the valve control edge if complete closing of the pressure-control valve device is required, without penetrating completely into the valve opening.

To achieve secure sealing without leakage loses of the first seat valve, which is under the pressure of the fluid in the inlet area, and to provide flow behavior that is independent of viscosity, in this case the valve control edge is preferably a sharp edge.

In relation to flow technology or at least production technology, it can be advantageous for the side of the valve aperture facing toward the inlet area to extend perpendicularly to the longitudinal axis of the pressure-control valve, or to taper continuously in the direction of the valve control edge.

The actual valve opening of the first seat valve can be made cylindrical, or it can expand continuously in the direction toward an intermediate space of the valve, whereby, particularly by virtue of the section that expands continuously in the downstream direction, pressure fluctuations at least on the outlet side can be reduced. In another design of the aperture it can be provided that a cylindrical section is formed between an area which tapers continuously in the upstream direction and a section that expands continuously in the downstream direction of the valve opening.

Particularly preferably, in the closed condition of the first seat valve the ratio between the penetration depth of the ball-shaped closing element into the valve opening and the diameter of the ball-shaped closing element has a value of 0.2 or larger. This gives a ratio of the diameter of the valve opening to the ball diameter of around 0.8 or more. In terms of production technology this can be achieved without difficulty and fulfills in an optimum manner the objective mentioned earlier, i.e. to ensure particularly enhanced insensitivity to pressure fluctuations. For that reason the diameter ratio of 0.8 is particularly preferred.

In a further, particularly preferred design of the invention a flow guiding device is arranged in the inlet area upstream from the first seat valve, by means of which a specified flow characteristic can be imparted to the inflowing fluid in the area of the first seat valve.

It has been shown that a pressure-control valve device made with such a flow guiding device, which also has the ratio of valve opening diameter to closing element diameter or penetration depth to closing element diameter, is substantially less sensitive to pressure fluctuations in the inlet area, i.e. the inflow side, and in the first outlet area, i.e. the working pressure connection, than the pressure-control valve devices known from the prior art.

Furthermore, in the valves known from the prior art the flow characteristic of the fluid flowing into the first seat valve depends in an unpredictable manner on a number of parameters, in particular the fluid pressure, the fluid flow speed and the design of the fluid system upstream from the pressure-control valve device (diameter and layout of the lines, etc.), whereby the flow characteristic of the fluid flowing into the valve is subject to pronounced fluctuations. The result of this can be that pressure-control valve devices of identical design operated with identical conditions (pressure level, fluid temperature, etc.) incorporated into different fluid systems have different control characteristics. For example, a pressure-control valve device in a shifting element of an automatic transmission can have a control characteristic different from that of an identically designed pressure-control valve device in a shifting element of an automated variable-speed transmission, which is attributable to the different designs of the fluid systems located upstream from the respective pressure-control valve devices.

By virtue of the measures proposed, a specific fluid characteristic is now imparted to the fluid flow, in particular a flow direction and a flow velocity (flow field). This means that the previously unpredictable characteristic of the fluid flowing into the pressure-control valve device is now deflected by the proposed flow guiding device along known, stabilized paths. In particular pressure fluctuations are thereby smoothed out or managed is such manner that they have no, or only a marginal effect on the pressure-control valve device.

By virtue of the propagation of the flow stabilized by the flow guiding device also downstream from the first seat valve, excitations or disturbances, in particular pressure fluctuations transmitted from the first outlet area of the pressure-control valve device, i.e. the working pressure connection, into the pressure-control valve device, are smoothed, whereby in an advantageous manner these are not propagated, or only to a limited extent, upstream from the pressure-control valve device.

The flow guiding device is preferably formed as one or more guide vanes, flow guiding ducts or other flow guiding elements in the inflow area. In this case the flow guiding device is in particular formed such that the fluid flowing in from the inlet area is led essentially around the closing element of the first seat valve. Thus, pressure fluctuations in the fluid flow no longer encounter the closing element perpendicularly, so that its excitation response is less pronounced and the control quality of the valve device is improved.

Since flowing onto the closing element is essential, it is proposed to design the flow guiding device so that the fluid flowing in from the inlet area is directed substantially in the form of a thin-walled flow along the closing element. This can be done if the flow guiding device directs the fluid toward the closing element essentially tangentially thereto. The fluid flow then no longer impinges perpendicularly on the closing element but, in a flow-assisting manner, is directed by the flow guiding device in the form of a thin film along the closing element. Since the fluid flow encounters the closing element tangentially and is directed along it, much smaller pressure fluctuation fractions are transmitted to it and this improves the control quality of the pressure-control valve device.

In a particularly preferred further development of the pressure-control valve device it is envisaged to design the flow guiding device so that it can impart a twisting motion to the inflowing fluid in the area of the first seat valve, in particular a flow that twists about a longitudinal or movement axis of the closing element of the first seat valve. This means that the flow characteristic determined by the flow guiding device corresponds to the twisting flow. This results in particularly effective damping of excitations or disturbances reaching the pressure-control valve device from the inlet area or the first outlet area. Such a twisting flow is particularly stable and absorbs excitations or disturbances with particularly effective damping. In this context a longitudinal or movement axis of the closing element is understood to mean an axis along which the closing element of the seat valve concerned can move to open and close the seat valve.

Furthermore, by the controlled guiding of the flow toward the first seat valve, particularly in the form of a twisting flow, the flow resistance of the first seat valve is reduced, this being attributable essentially to a smaller turbulent flow fraction in the inflowing fluid, whereby the tendency to excite fluctuations is diminished.

In a further preferred embodiment of the pressure-control valve device a second flow guiding device is provided alternatively or in addition to the first flow guiding device, which is arranged upstream from the second seat valve and in flow terms between the first and second outlet areas. This is designed such that the fluid flowing to the second outlet area is given a twisting motion in the area of the second seat valve. In particular, it is proposed that the fluid flowing through the second seat valve has imparted to it by the second flow guiding device a twisting motion about a longitudinal or movement axis of the closing element of the second seat valve, which improves the valve dynamics and allows a leakage volume flow of the pressure-control valve device to be reduced. As has been shown, these effects are reinforced if the first and second flow guiding devices are designed such that the twist direction of the fluid flow through the first seat valve is the same as the twist direction of the fluid flow through the second seat valve. If the first flow guiding device is designed to produce a twisting flow, the second flow guiding device can be designed analogously to it.

In a further development of the pressure-control valve device the first flow guiding device comprises at least one and preferably a plurality of flow guiding ducts, which open at least approximately tangentially onto a seat valve opening of the first seat valve in the inlet area. In other words, to impart the flow characteristic the flow guiding duct or ducts open(s) in the inlet area laterally offset relative to the seat valve opening. In this way the fluid flow is guided with very little friction essentially tangentially to the closing element of the first seat valve. The creation of a fluid flow passing through the first seat valve in the form of a thin film along the closing element is assisted thereby. Preferably, the flow guiding ducts extend downstream in the direction of the seat valve opening in a funnel-shaped mutual arrangement, particularly in such manner that as it approaches the seat valve opening the fluid accelerates (rotation impulse maintenance). If only one flow guiding duct is provided, this extends downstream toward the seat valve opening in a funnel shape. Preferably, relative to a longitudinal or movement axis of the closing element of the first seat valve this funnel shape has an opening angle of 40° to 80°, particularly preferably 60°±10°. The funnel shape can also be rounded, in particular convex or concave. The opening angle then corresponds to an average inclination angle of the funnel shape relative to the longitudinal or movement axis of the closing element. The flow guiding duct or ducts can also each be made helical in shape. Preferably the helix then extends concentrically or eccentrically around the longitudinal or movement axis of the closing element. Instead of or in addition to the helical shape, the flow guiding duct or ducts can extend toward the seat valve opening in a spiral, i.e. in the downstream direction they approach the seat valve opening with a decreasing radius.

In a further development of the pressure-control valve device the width or diameter of the flow guiding duct or ducts, i.e. their flow cross-section, decreases as they get closer to a longitudinal or movement axis of the closing element of the first seat valve. In particular a fluid inlet opening or cross-section through which fluid flows into the flow guiding duct concerned has a larger through-flow area than a fluid outlet opening or fluid outlet area through which fluid flows out of the flow guiding duct, the latter being closer to the longitudinal or movement axis compared with the inlet opening or inlet cross-section. This increases the flow velocity of the fluid in the flow guiding ducts with increasing proximity to the longitudinal or movement axis and thus toward the valve opening of the first seat valve, which produces a more rapid and more stable fluid flow downstream from the flow guiding ducts in the area of and downstream from the first seat valve.

In one design of the pressure-control valve device, a cross-section of the flow guiding ducts in a plane perpendicular to the longitudinal or movement axis of the first seat valve is propeller-shaped or at least substantially propeller-shaped. In other words, the flow guiding ducts in each case form propeller-blade-shaped hollows or channels such that at the base of each propeller blade there is at least one opening for fluid to emerge in the direction of the first valve seat. These openings can extend over the full length of each flow guiding duct or they can be located only in the area of the valve opening of the first seat valve. To produce a twisting flow, the outlet opening of each flow guiding duct is preferably laterally offset relative to the longitudinal or movement axis, i.e. it is directed tangentially past the longitudinal or movement axis. In particular therefore, the outlet opening is designed so that the fluid emerges from the flow guiding ducts tangentially or at least approximately tangentially relative to the valve opening of the first seat valve. The propeller shape of the flow guiding ducts preferably corresponds to or resembles the propeller shape of a nautical or aviation propeller, for example a boat, ship or aircraft screw, although it is not limited thereto. The propeller blade shape can also correspond to or resemble the shape of a clover leaf (for example *Quadrifolium pratense*).

The flow guiding device can both be an integrated part of a housing of the pressure-control valve device, for example if the flow guiding device is injection molded, milled or drilled into the housing by production-technological means, or it can be an independent component fixed in the pressure-control valve device, i.e. for example pressed, bonded, injection molded or screwed into it during the production process. For this, the flow guiding device is for example made as a sleeve which is fixed into a housing of the pressure-control valve device during the assembly of the pressure-control valve device. In this case the first seat valve can also form a conjoint structural unit with the flow guiding device.

In a further design a control edge of the first seat valve of the pressure-control valve device is formed essentially acute-angled or right-angled. Particularly when the flow guiding device is designed to produce a twisting flow, this results in a low-loss passage through the valve opening of the first seat valve. For this, in a flow-assisting manner the control edge has no chamfer or only a very slight one (chamfer radius smaller than 0.1 mm), i.e. the control edge is made as "sharp-edged" as possible. Preferably, the valve opening expands continuously downstream from the valve control edge or a control surface of the first seat valve. In this way, downstream from the first seat valve, the valve opening acts as a diffuser which additionally reduces pressure fluctuations from the inlet side or at least supports a reduction of pressure fluctuations. Moreover, the diffuser action produces an under-pressure, i.e. a pressure drop in the immediate vicinity of the closing element of the first seat valve, which assists the opening or closing of the first seat valve and thereby improves the valve dynamics.

In a particularly preferred variant of the pressure-control valve device, it comprises a proportional electromagnet, i.e. an electromagnet with an armature whose position can vary as a function of an electric current passed through the electromagnet. In this case the armature serves to move the two closing elements of the first and second seat valves coupled to one another. This enables the pressure applied/determined at the first outlet area to be precisely adjusted or regulated by means of the electric current supplied.

Furthermore, the proposed pressure-control valve device is preferably designed as a hydraulic pressure-control valve device, in particular as a hydraulic pressure-control valve device of a vehicle transmission. A field of application of the pressure-control valve device is in particular in a gearshift mechanism of hydraulic design for engaging various gear ratio steps of a multi-stage automatic transmission or automated variable-speed transmission in a vehicle, although it is not limited to this. Thus, applications other than in the automotive sector are also possible, for example in a stationary hydraulic unit.

BRIEF DESCRIPTION OF THE DRAWINGS

Below the invention is explained in more detail with reference to examples and drawings, from which further advantageous design features and characteristics of the invention emerge. The drawings show, in each case represented schematically.

DETAILED DESCRIPTION OF THE PREFERRED EMBODIMENTS

In FIGS. 1 to 4 the same components, or at least components having the same function, are in each case provided with the same indexes.

Figure 1:
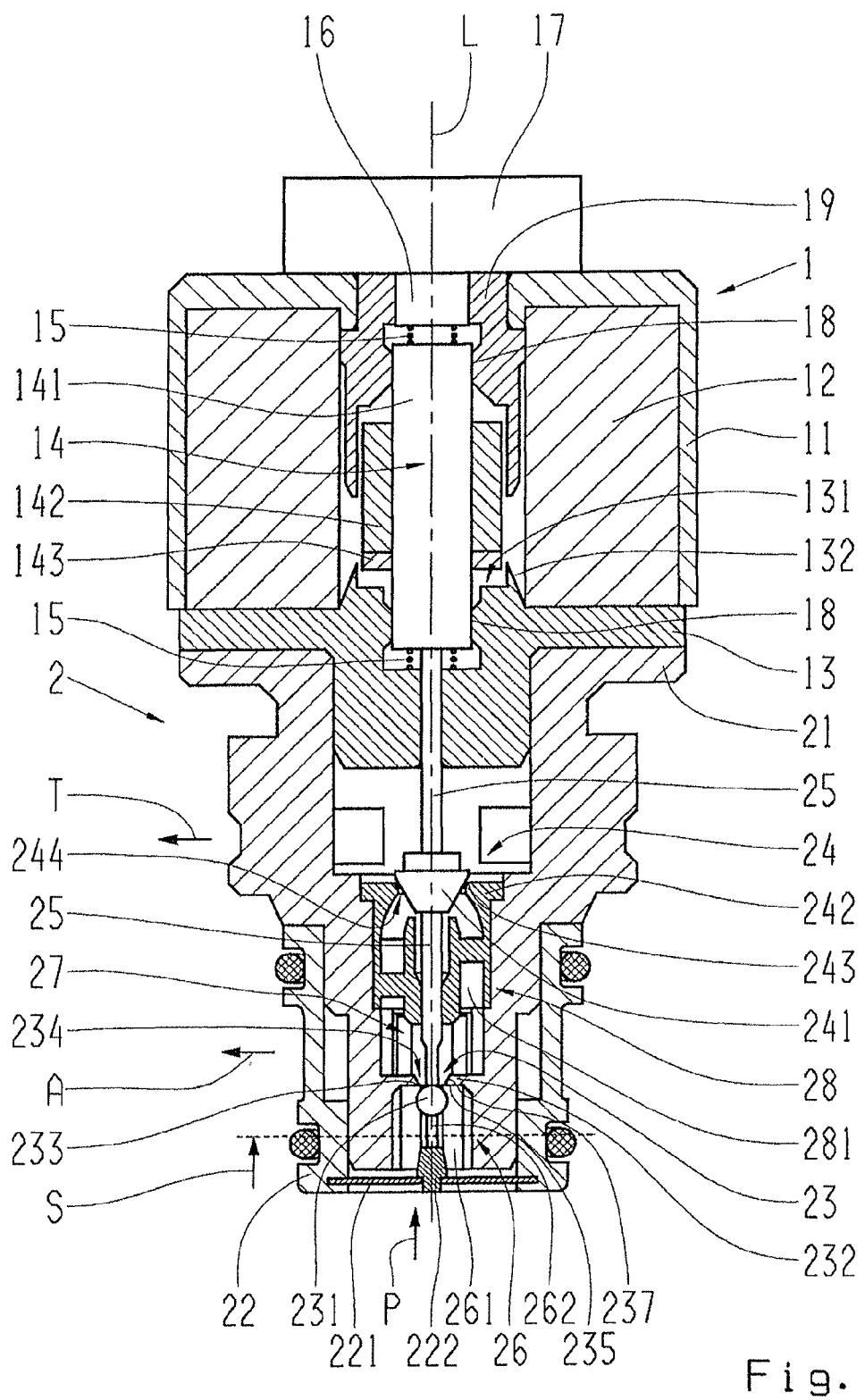
FIG. 1: A two-dimensional section through a proposed pressure-control valve device, taken along a longitudinal axis thereof.

FIG. 1 shows a longitudinal section through a pressure-control valve device made as a proportional pressure-control valve. The pressure-control valve device comprises essentially of an electromagnet portion 1, i.e. an actuator, and a valve portion 2, whose housings 11, 21 are connected fixed to one another. The electromagnet position 1 comprises an electromagnet consisting at least of an electric solenoid 12 arranged in the housing 11, a magnetic yoke 13 positionally fixed relative to the solenoid 12 and an armature 14 that can move relative to the solenoid 12 and the magnetic yoke 13. In the case illustrated the armature 14 is made in three parts and comprises an armature rod 141, an armature body 142 and an anti-sticking disk 143 made of a nonmagnetic material such as aluminum. However, other armature designs or types can be used equivalently. The anti-sticking disk 143 prevents the armature 14 from sticking fast magnetically when the solenoid 12 changes from an energized to a de-energized condition. To enable pressure equalization within the electromagnet portion 1 when the armature 14 is moved, the armature rod 141 is preferably provided with pressure equalization openings, i.e. bores.

The position of the armature 14 in the de-energized condition of the solenoid 12 is determined by two elastic spring elements 15, in this case for example compression spiral springs, within the electromagnet portion. The pre-stress of the spring element 15 facing away from the valve portion 2 can be adjusted by a pre-stressing element 16. In particular, as in the case illustrated, this can be press-fitted, in which case the pre-stress is adjusted as a function of the insertion depth, or it can be screwed in, when the pre-stress is adjusted as a function of the screw-in depth. Joined to the housing 11 of the electromagnet portion 1 are an electric contacting device 17 electrically connected to the solenoid 12 and by means of which the solenoid 12 can be energized with current from an electronic unit (not shown) external to the pressure-control valve device. In an alternative design of the pressure-control valve device this electronic unit, or at least parts of it, are integrated in the electromagnet position 1.

On a side facing toward the armature 14 the magnetic yoke 13 has an insertion recess 131 with a magnetic control edge 132. By virtue of the design of the magnetic control edge 132, here in the shape of a cone, how large the magnetic force acting on the armature 14 is as a result of the momentarily supplied electric current and the momentary position of the armature 14 can be precisely adjusted. However, the magnetic control edge 132 is preferably designed so that the magnetic force applied is proportional to the size of the current supplied to the solenoid 12, as largely independently as possible of the precise position of the armature 14 relative to the magnetic yoke 13 (proportional electromagnet). Opposite the magnetic yoke 13 the electromagnet portion 1 has a positionally fixed pole tube 19 which serves to improve the alignment of the magnetic field of the solenoid 12. In the present case, for example, the armature 14 is fitted with a first slide bearing 18 in the pole tube 19 and with a second slide bearing 18 in the magnetic yoke 13 so that it can move axially in the direction of a longitudinal axis L of the pressure-control valve device. However, other bearing designs can be used in an equivalent manner.

Joined to the electromagnet portion 1, the pressure-control valve device comprises the valve portion 2. This has a filter strainer 22 plugged onto the housing 21, with a first filter 221 on the inlet side on the end of the pressure-control valve device and, on the outlet side, a second filter (not shown, however) on the outlet side arranged laterally relative to the pressure-control valve device. The first filter 221 serves to filter the fluid flowing into the pressure-control valve device, while the second filter serves to filter the fluid flowing out of a working connection of the pressure-control valve device. Arranged on the filter strainer 22 are O-ring seals which separate in inlet area P, a first outlet area A and a second outlet area T fluidically from one another. The inlet area P, also called the pressure supply connection or area, is arranged at an axial end of the pressure-control valve device, while the first outlet area A, also called the working pressure connection or area, and the second outlet area T, also called the tank connection or area, are arranged radially relative to the longitudinal axis L. However, with a correspondingly appropriate duct layout within the valve 2 the arrangement of the inlet area P and the first and second outlet areas A, T can be interchanged. A preferred flow direction of the fluid into and out of the inlet area P and the first and second outlet areas A, T is indicated by arrows.

Within the housing 21, the valve 2 comprises a first seat valve 23 and a second seat valve 24, by means of which the inlet area P, the first outlet area A and the second outlet area T can be put in flow connection with one another. This allows a pressure level in the first outlet area A to be selectively adjusted. The first seat valve 23 has an essentially spherical closing element 231 that can move along a longitudinal axis of the first seat valve 23 and the second seat valve 24 also has a closing element 241 that can move along a longitudinal axis of the second seat valve 24, in the form of a cone in the example shown. In this case the longitudinal or movement axes of the seat valves 23, 24 coincide with the longitudinal axis L of the pressure-control valve device. However, by using suitable deflection means the longitudinal or movement axes of the seat valves 23, 24 can be different and for example parallel or inclined relative to one another.

The counter-component to the closing element 231 forms a valve aperture 232 positionally fixed relative to the closing element 231, whose side 235 facing the inlet area P is perpendicular to the longitudinal axis L. The valve aperture 232 has a control edge 233 (valve seat) against which the closing element 231 rests in the closed condition illustrated, whereby the first seat valve 23, is sealed in a fluid-tight manner as effectively as possible. A first effective valve opening area formed between the closing element 231 and the control edge 233 when the first seat valve 23 is opened, and an area 237 following it, which widens out continuously in the manner of a diffuser, determine the quantity of fluid flowing in through the first seat valve 23 and the pressure drop at the first seat valve 23, whereby the pressure applied or measureable at the first outlet area A is also influenced.

In this case the ratio $D_V/D_K$ of the diameter $D_V$ of the valve opening 234 to the ball diameter $D_K$ is at least equal to 0.75 or larger, so that the ratio $t/D_K$ of the penetration depth t of the ball 231 in the area of the control edge 233 to the diameter $D_K$ of the ball 231 is preferably equal to 0.2.

The counter-component of the closing element 241 of the second seat valve 24 also forms a valve aperture 242 which, however, has a conical control surface 243 (valve seat) instead of a control edge. The closing element 241 rests against the control surface 243 when the second seat valve 24 is closed, whereby the second seat valve 24, specifically a valve opening 244 of the second seat valve 24, is sealed in as fluid-tight a manner as possible. A second effective valve opening area formed between the closing element 241 and the control surface 243 when the second seat valve 24 is opened determines the quantity of fluid flowing out through the second seat valve 24, whereby the pressure applied or measureable at the first outlet area A is also influenced. Since as a rule the fluid flowing through the second seat valve 24 passes unused into a fluid reservoir, the quantity of fluid flowing through the second seat valve 24 is often also referred to as leakage. In the configuration of the pressure-control valve device illustrated, the closing element 231 of the first seat valve 23 is located upstream from the valve opening 234 and the closing element 241 of the second seat valve 24 is located downstream from the opening 244.

In this context it is clear that the second seat valve 24, or specifically its closing element 241 and the corresponding valve aperture 242 can also be designed in some other suitable way. For example, the second seat valve 24 can be made as a ball valve with a spherical closing element, analogously to the first seat valve 23. Likewise, the second seat valve 24 can be made with a flat valve seat. In the case illustrated the first seat valve 23 has a control edge 233 against which the closing element 231 rests in the closed condition, i.e. there is essentially linear contact between the closing element 231 and the aperture 232, whereas the second seat valve 24 has a control surface 243 against which the closing element 241 rests in the closed condition, i.e. there is contact between the closing element 241 and the valve aperture essentially over an area. It is clear, however, that the seat valves 23, 24 can also be made so that one or both of the two seat valves 23, 24 can have contact over an area or can have linear contact between their respective closing elements 231, 241 and their valve apertures 232, 242. To produce contact over an area the valve aperture has a control surface matching the surface shape of the closing element, while to produce linear contact the valve aperture has a control edge matching the surface shape of the closing element.

The closing elements 231, 241 of the seat valves 23, 24 are actuated by a tappet rod 25 that can move along the longitudinal axis L, to which at least the closing element 241 of the second seat valve 24 is connected. This connection can be both positionally fixed (as shown), or made flexible by an interposed elastic element, for example a compression spring or the like arranged between the closing element 241 and the tappet rod 25. The closing element 231 of the first seat valve 23 can either also be connected thus to the tappet rod 25 or it can be completely separate from the rod 25, in which case, to open the first seat valve 23, the tappet rod 25 just pushes the closing element 231 away from the valve aperture 232 to open the first seat valve 23, thereby opening up the valve opening 234. If the closing element 231 is detached from the tappet rod 25, the first seat valve 23 is closed exclusively by the pressure of the fluid flowing in from the inlet area P. By means of the tappet rod 25, the closing element 231, 241 are coupled with one another in such manner that the seat valves 23, 24 can only be actuated alternately. This means on the one hand that when the first seat valve 23 is open the second seat valve 24 is closed and, on the other hand, when the first seat valve 23 is closed the second seat valve 24 can be opened. Thus, the arrangement and coupling of the seat valves 23, 24 correspond to a hydraulic semi-bridge circuit.

The tappet rod 25 passes through the magnetic yoke 13 and rests in contact with an end face of the armature 14 facing toward the valve portion 2. As an alternative, it can also be positionally fixed with the armature 14 or connected thereto by an elastic element, for example a compression spring or the like. The opening through which the tappet rod 25 passes through the magnetic yoke 13 is preferably fluid-tight and designed to guide the tappet rod 25. Thus, a magnetic-force-induced axial movement of the armature 14 toward the valve portion 2 is transmitted directly to the tappet rod, so that the latter is moved along with it and thereby opens the first seat valve 23 and closes the second seat valve 24. In essence, during this a spring force of the spring element 15 positioned in the direction of the valve portion 2 and a fluid pressure acting on the closing element 231 produce an increasing force in opposition to the magnetic force as the displacement of the armature 14 and the tappet rod 25 increases, so that the first seat valve 23 opens only until and the second seat valve 24 closes only until a force equilibrium is established between the magnetic force and the force opposing it. Depending on the opening aperture widths of the seat valves 23, 24 a certain fluid pressure is produced in the first outlet area A, which is lower than the fluid pressure applied at the inlet area P but higher than the fluid pressure at the second outlet area T. Here, the fluid pressure at the second outlet area T as a rule corresponds to the atmospheric pressure since it is normally connected to a fluid reservoir under atmospheric pressure. Since the magnetic force acting on the armature 14 depends on the size of the electric current supplied to the solenoid 12 and the opposing force depends on the displacement of the armature 14, the pressure level at the first outlet area A can be adjusted or regulated very accurately by virtue of the electric current supplied.

It should be pointed out here that the positions or switch settings of the armature 14, the tappet rod 25 and the seat valves 23, 24 shown in FIG. 1 correspond to an initial condition of the pressure-control valve device in which the solenoid 12 is not energized so that no magnetic force acts upon the armature 14. Since in this case the first seat valve 23 is fully closed and the second seat valve 24 is fully open so that no fluid can flow through the pressure-control valve device from the inlet side P (a pressure is set to "0" at the first outlet side), the pressure-control valve device illustrated is a 'normally closed' pressure-control valve device with an upward valve characteristic. In other words, as the size of the current supplied increases the first seat valve 23 opens and the second seat valve 24 closes, whereby the pressure determined at the first outlet area A increases.

The pressure-control valve device shown can also be redesigned so that it corresponds to a 'normally open' pressure-control valve device with a downward valve characteristic. In such a case, in the non-energized initial condition of the pressure-control valve device the first seat valve 23 is fully open and the second seat valve 24 is fully closed, so that fluid from the inlet area A can flow exclusively to the first outlet area A, where the pressure is maximum. As the current energizing the solenoid 12 increases the first seat valve 23 is closed and the second seat valve 24 is opened, and the pressure that can be measured at the first outlet area P falls correspondingly. For this, the first and second seat valves 23, 24 are re-configured so that the closing element 231 is downstream from the valve opening 234 and the closing element 241 is upstream from the valve opening 244, while the magnetic yoke 13 with the insertion recess 131 and the control edge 132 are arranged on the side of the electromagnet portion 1 facing away from the valve portion 2.

According to FIG. 1 on the inlet side, i.e. upstream from the first seat valve 23, a first flow guiding device 26 is arranged in the inlet area P which imparts, to the fluid flowing in, a specified flow characteristic in the area of the first seat valve 23. In this way, in particular both the flow resistance of the closing element 231 of the first seat valve 23 can be reduced, and also the pressure-control valve device can be made less sensitive to excitations or disturbances of the fluid flow, such as pressure fluctuations. By imparting a specified flow characteristic the pressure-control valve device can also be used more independently of different fluid systems, since independently of the fluid system the fluid flowing in can be led along predictable paths before contact with the seat valves 23, 24, i.e. it has the specified flow characteristic. Accordingly the pressure-control valve device is simpler and can be used with different fluid systems without adaptation effort.

In the case illustrated the flow guiding device 26 consists of a plurality of flow guiding ducts 261 located in the form of hollows along the longitudinal axis L of the pressure-control valve device in the housing 21 of the valve portion 2. Along a section plane S extending perpendicularly to the longitudinal axis L each of the flow guiding ducts 261 has a cross-section in the form of a propeller blade or clover leaf (see FIGS. 2 and 3d). With increasing proximity to the longitudinal axis L, therefore, the width and thus the through-flow area of each flow guiding duct 261 decreases, so that as the fluid flows through the flow guiding ducts 261 it accelerates with increasing proximity to the longitudinal axis L. This is amplified by the fact that downstream, in the direction toward the seat valve opening; the flow guiding ducts 261 run together in the shape of a funnel (see FIG. 2). Hereby, the funnel shape is formed in the axial direction of the longitudinal axis L by the end areas of the flow guiding ducts 261, which are convergently inclined relative to the longitudinal axis L.

Centrally to the flow guiding device 26, in this case for example coaxially with the longitudinal axis L, there is in the inlet area P an in particular circular opening 262, for example a bore, within which the closing element 231 of the first seat valve 23 is arranged and can move and into which the flow guiding ducts 261 open. In the upstream direction the opening 262 is closed by a plug 222 which prevents the closing element 231 from falling out of the pressure-control valve device. In the example embodiment illustrated the plug 222 is part of the filter strainer 22, although it can also be made as a separate component or as part of the flow guiding device 26 or of the housing 21. What is not shown is that the plug 222 is preferably designed to assist flow, in particular having a drop-shaped or pointed conical form. Thus, the plug 222 preferably forms part of the flow guiding device 26. This can also be because the plug 222 as well has flow guiding ducts, guide vanes or the like. The plug 222 and the housing 21 can also be made such that the flow guiding device 26 is only formed when these components are assembled together, i.e. the two components 21, 222 comprise complementary constituents of the flow guiding device 26 which only form the actual flow guiding device 26 when the components 21, 222 are assembled together.

In a version of the pressure-control valve device (also not illustrated) the flow guiding device 26 is formed of a sleeve which is inserted axially, for example pressed or bonded into the housing 21 in particular during the assembly of the pressure-control valve device. The sleeve can even comprise parts of the first seat valve 23, in particular the valve aperture 232, or it can integrate the entire first seat valve 23.

The flow guiding ducts 261 open at least approximately tangentially into the opening 262 or the valve opening 234 of the first seat valve 23 in the inlet area P, i.e. outlet openings of the flow guiding ducts 26 open into the opening 262 laterally offset relative to the longitudinal axis L. In this way a twisting motion around the longitudinal axis L is imparted to the fluid flowing into the opening 262 and valve opening 234, which directs and stabilizes the flow particularly advantageously and thus renders the flow very insensitive to pressure fluctuations. In detail, at the closing element 231 the fluid flowing into the pressure-control valve device forms a tangential and thin-film flow with low flow resistance along the surface of the closing element 231. This transmits pressure fluctuations or other disturbances or excitations not at all or only to a very small extent to the closing element 23'. Furthermore, the twisted flow stabilizes the position of the closing element 23' along the rotation axis of the flow, i.e. in the case illustrated the longitudinal axis L. Thus, even if excited by other forces such as mechanical vibrations in the housings 11 and 21, the closing element 23' is kept stable in the twisting flow. Preferably but not necessarily, the flow guiding devices 26, 28 are designed, as shown, so that the twisting flows they produce each have the same rotational direction.

After flowing through the first seat valve 23 the fluid passes into an intermediate space 27 where the fluid flow divides into a first part-flow toward the first outlet area A and a second part-flow toward the second seat valve 24. The quantity ratio between the first and second part-flows is determined by the opening width of the second seat valve 24, to be specific by its effective valve opening area. The first outlet area A has lateral openings in the housing 21 of the valve portion 2 to allow the first part-flow to flow out. Analogously, the second outlet area has lateral openings in the housing 21 to allow the second part-flow to flow out.

Optionally, as is shown in FIG. 1, a second flow guiding device 28 is arranged in the intermediate space 27 upstream from the first seat valve 23 and in terms of flow between the first and second outlet areas A, T. This is designed such that the fluid flowing to the second outlet area T, i.e. the second part-flow, is made in the area of the second seat valve 24 to twist about the longitudinal or movement axis of the first seat valve 23, here the longitudinal axis L of the pressure-control valve device. In this case the second flow guiding device 28 consists essentially of a twist producer with a plurality of flow guiding ducts 281 and the valve aperture 242 of the second seat valve 24. The flow guiding ducts 281 each extend helically and concentrically to the longitudinal axis L. Starting from an outlet of the flow guiding ducts 281 the valve aperture 242 extends to the valve opening 244 of the second seat valve 24 in the shape of a nozzle, so that the speed of the twisting flow increases downstream with increasing proximity to the valve opening 244 (angular momentum maintenance). After passing through the second seat valve 24 the fluid then reaches the second outlet area T. This is often associated with a fluid reservoir under the pressure of the surrounding atmosphere. With a design of the pressure-control valve device incorporating a second flow guiding device 28 the dynamics of the pressure-control valve device can be increased and at the same time its leakage can be reduced.

Basically the second flow guiding device 28 shown in FIG. 1 can also be designed differently, for example with guide vanes or suchlike for producing the twisting flow. Or else the second flow guiding device 28 can be omitted, particularly when greater leakage or lower valve dynamics are acceptable or even desired. However, the second flow guiding device 28 can also be made analogously to one of the design forms described herein for the first flow guiding device 26. Thus for example, the first and second flow guiding devices 26, 28 can also be designed in the same way. Basically, the second flow guiding device 28 can be provided in addition to the first flow guiding device 26 or as an alternative to it. In the latter case, therefore, the first flow guiding device 26 is omitted. Then, for example, only one opening is provided in the inlet area P, through which the fluid coming in reaches the first seat valve 23 without any specific flow characteristic.

In the example embodiment shown, the second flow guiding device 28 is made integrally, although of course the twist producer and the valve aperture 242 can also form a multi-part component. Alternatively, the twist producer and/or the valve aperture 242 form an integral component with the housing 21. Furthermore, to actuate the tappet rod 25, i.e. to move it linearly, instead of the electromagnet portion 1 some other suitable actuating system can be provided, for a hydraulic, pneumatic or other type of electric actuator (piezoelectric, electrostrictive, electric motor, etc.) that acts in a linear direction.

Figure 2:
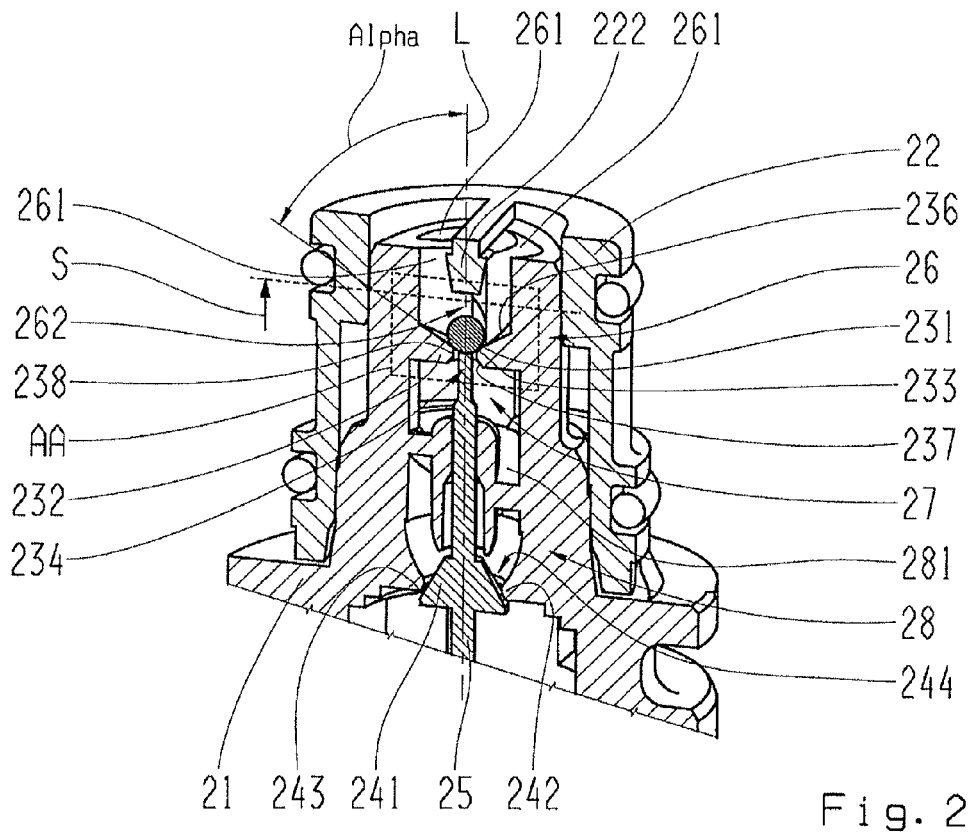
FIG. 2: An isometric section through a valve portion of a pressure-control valve device according to FIG. 1, along a longitudinal axis of the pressure-control valve device.

FIG. 2 shows an enlarged isometric view of the valve portion 2 of the pressure-control valve device in FIG. 1. Here, the electromagnet portion 1 is not shown. As can be seen in FIG. 2, the valve control edge 233 of the seat valve 23 has an obtuse angle and the side 236 of the valve aperture 232 facing toward the inlet area P is formed such that it tapers down continuously in the manner of a nozzle toward the valve control edge 233. Downstream from the valve control edge 233 the valve opening 234 is at first formed as a cylindrical section 238. After the cylindrical part it widens in a continually expanding area 237 in the manner of a diffuser, as far as the intermediate space 27.

In this case too the ratio of the diameter $D_V$ of the valve opening 234 to the ball diameter $D_K$ is at least 0.75. In addition the ratio $t/D_K$ of the penetration depth t of the ball 231 in the area of the valve control edge 233 to the diameter $D_K$ of the ball is preferably equal to 0.2. FIG. 2b shows a very schematic enlarged view of the section AA in FIG. 2, in which the diameter $D_V$ and $D_K$ and the penetration depth are made clear. From this it can be seen that the penetration depth t is preferably measured from the valve control edge 233 against which the closing element 231 rests in the closed condition of the first seat valve 23, to the end of the part of the closing element 231 that has penetrated farthest into the valve opening 234. In this design the diameter $D_V$ of the valve opening 234 corresponds at the same time to the diameter of the valve control edge 233 and the cylindrical section 238. However, depending on the design of the first seat valve 23 these diameters can also be made different. For simplicity, the tappet rod 25 is not shown in FIG. 2b and the inlet area P is identified with an arrow.

In the embodiment shown in FIG. 2 the flow guiding ducts 261 are made as slots in the housing 21 that extend straight along the longitudinal direction L, such that in a section plane S perpendicular to the longitudinal direction L their cross-section is propeller-shaped. Other suitable cross-section shapes are also conceivable. In particular the flow guiding ducts 261, instead of extending straight along the longitudinal axis L, can also run in a helical shape around the longitudinal axis L, like or similarly to the flow guiding ducts 281 of the second flow guiding device 28.

In the example embodiment shown in FIG. 2 the flow guiding ducts 261 converge downstream in the direction toward the valve opening. For this, end areas, in this case straight end surfaces of the flow guiding ducts 261 are inclined relative to the longitudinal axis L. In the case shown the opening angle ALPHA of the funnel shape is about 60°, although the opening angle is preferably around 60°±10°. The funnel shape, i.e. here the end areas of the flow guiding ducts 261, can even be rounded and thus convex or concave. In that case the opening angle corresponds to an average slope angle of the funnel shape relative to the longitudinal axis L.

Figure 2A:
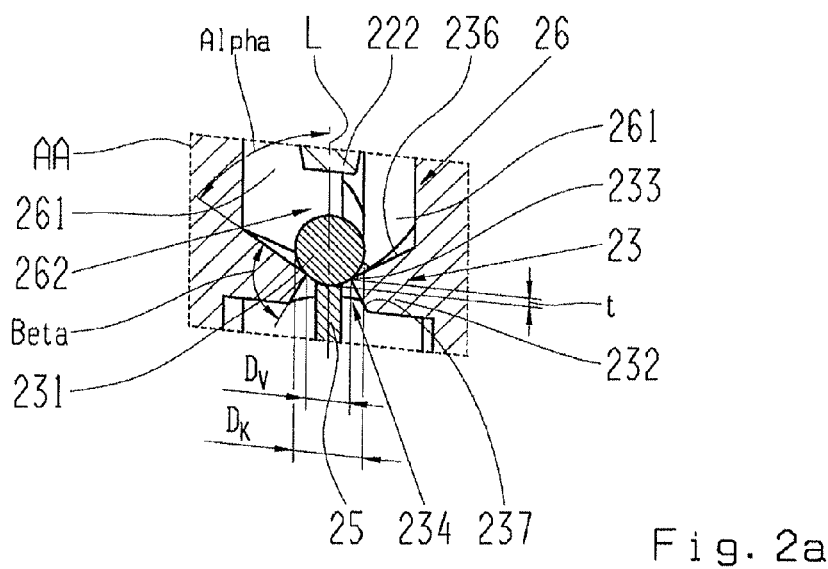
FIG. 2a: An enlarged representation of a section AA from FIG. 2, with an alternative design of a valve opening of the first seat valve.
Figure 2B:
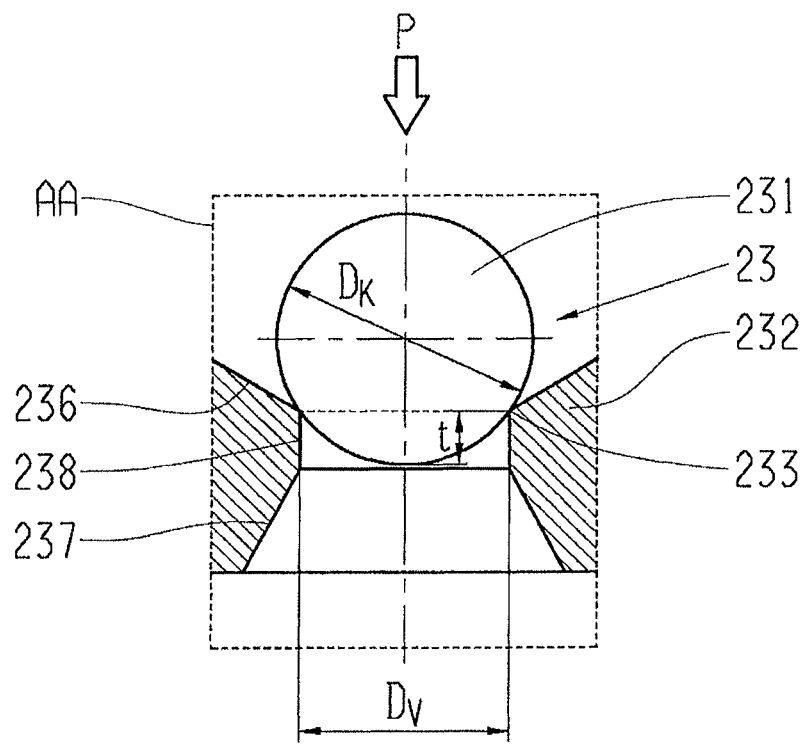
FIG. 2b: An enlarged representation of a section AA from FIG. 2, FIGS. 3a-3e: Sectional representations of alternative flow guiding devices, taken along a section plane extending perpendicularly to the longitudinal axis of the pressure-control valve device.

FIG. 2a shows an enlarged view of the section AA in FIG. 2, but with an alternatively designed valve control edge 233 and valve opening 234. An area 236 which tapers continuously in the manner of a nozzle is located upstream from the valve control edge 233. Compared with the version according to FIGS. 1 and 2 the valve control edge 233 of the first seat valve 23 is in this case made as a right-angle (angle-BETA), with no chamfer or one that is negligibly small, i.e. the valve control edge 233 is "sharp". This results in an advantageously lower flow resistance as the fluid passes through the first seat valve 23. Downstream from the valve control edge 233, the valve opening 234 of the first seat valve 23 widens out continuously in the manner of a diffuser. The resulting diffuser action damps pressure fluctuations induced upstream or downstream from the inlet area P as well as producing a pressure drop in the immediate vicinity of the closing element 231, which assists closing or opening movement of the closing element 231 and thereby improves the valve dynamics. Instead of flat surfaces, upstream and/or downstream from the valve control edge 233 the valve opening 234 can also have curved surfaces, i.e. these can be convex or concave. Likewise, instead of being right-angled the valve control edge 233 can also be made acute-angled. In this embodiment too, a diameter ratio $D_V/D_K$ of at least 0.75 and preferably a ration $t/D_K$ of the penetration depth t=0.2 to the diameter $D_K$ of the closing element 231 can be produced.

FIGS. 3a to 3e show examples of alternatively designed cross-sections of the flow guiding ducts 261 in FIGS. 1 and 2 along the section plane S.

Figure 3A:
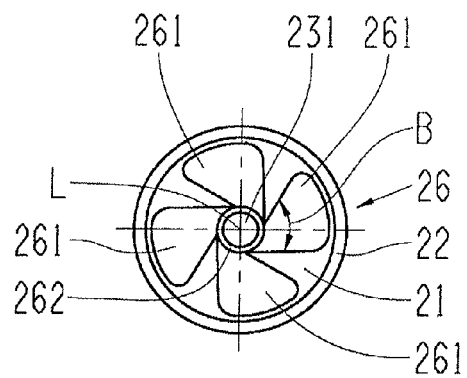

According to FIG. 3a the flow guiding device 26 has four propeller- or clover-leaf-shaped flow guiding ducts 261. The width or flow cross-section B of the flow guiding ducts 261 decreases with increasing proximity to a longitudinal axis L of the pressure-control valve device, in particular the longitudinal or movement axis of the first seat valve. The flow guiding ducts 261 each have an outlet that opens into the common opening 262, in this case extending coaxially along the longitudinal axis L, within which the closing element 231 of the first seat valve is arranged and can move. To produce a twisting flow, in the case illustrated a flow with a clockwise rotational direction, the outlet openings are laterally offset relative to the longitudinal axis L in such manner that they face tangentially past the longitudinal axis L. Accordingly, the fluid emerging from the flow guiding ducts 261 flows into the opening 262 tangentially or at least approximately so relative to the valve opening of the first seat valve, preferably in the form of a thin film along the closing element 231. In other words, at the base of each propeller-blade-shaped flow guiding duct 261 there is a fluid outlet opening leading into a common opening 262 of the flow guiding device 26, which merges downstream into the valve opening of the first seat valve, the opening location of the outlet opening into the opening 262 being chosen such that a twisting flow is produced downstream from the flow guiding ducts 261 in the area of the first seat valve.

Figure 3B:
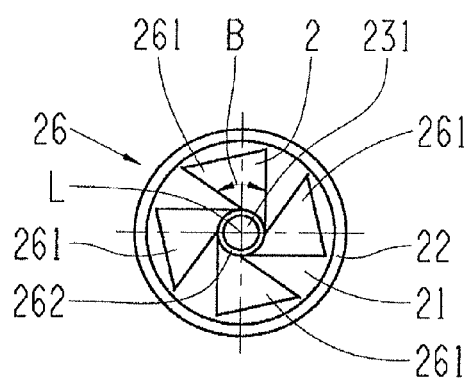

In contrast to the flow guiding device 26 of FIG. 3a, the flow guiding device 26 shown in FIG. 3b has propeller-shaped flow guiding ducts 261 with essentially triangular cross-sections. The corners of the triangular shape can of course be rounded off, i.e. provided with an internal radius.

Figure 3C:
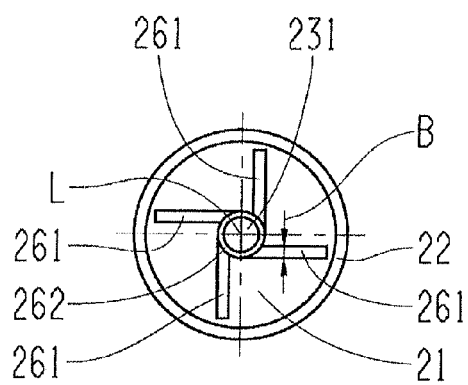

The flow guiding device 26 in FIG. 3c differs from the flow guiding device 26 of FIG. 3a in that the flow guiding ducts 261 have quadrangular, here in particular rectangular cross-sections. Correspondingly, the width B of the flow guiding ducts 261 is constant. In this case too the corners of the quadrangular shape can be rounded.

Figure 3D:
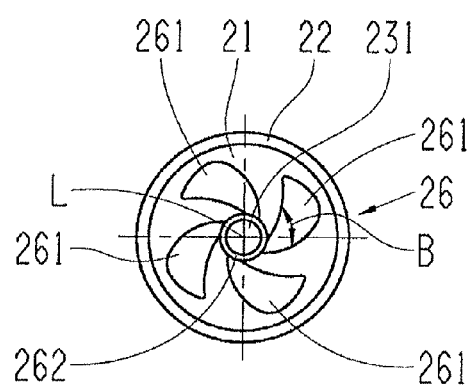

The flow guiding device 26 of FIG. 3d corresponds essentially to the flow guiding device 26 in FIG. 3a but with the flow guiding ducts 261 more markedly curved compared with those of FIG. 3a. In other words, an inner area of the flow guiding ducts 261 relative to the longitudinal axis L is offset relative to an outer area in the direction of the rotation direction of the fluid flow envisaged, whereby the twist-producing action of the flow guiding device 26 is improved. In this case the flow guiding ducts 261 each run in a spiral shape into the opening 262 or valve opening of the first seat valve. This design corresponds to the version depicted in FIG. 2.

Figure 3E:
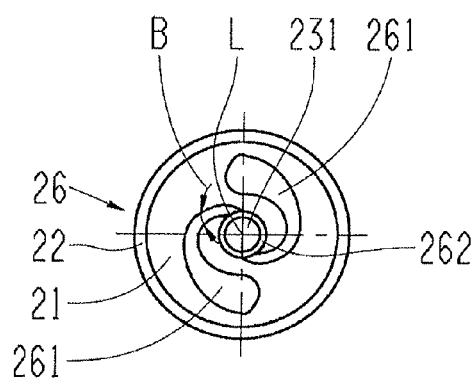

Compared with FIG. 3d the flow guiding device 26 of FIG. 3e has a more pronounced spiral-shaped curvature of the flow guiding ducts 261, and in addition only two flow guiding ducts 21 are provided.

The flow guiding ducts 261, in particular those illustrated in FIGS. 3a to 3e, can be made as shown in FIGS. 1 and 2 in the form of hollows extending essentially along the longitudinal axis L, i.e. with sidewalls directed substantially parallel to the longitudinal axis L. Alternatively the flow guiding ducts 261 can also be made helically shaped, in particular running coaxially around the longitudinal axis L. Instead of two or four flow guiding ducts 261, in each case three, five, six, etc. ducts 261 can also be provided. A flow guiding device 26 with only one flow guiding duct 261 is also possible. A uniform distribution of the flow guiding ducts 261 around the longitudinal axis L, i.e. with equal distances between the flow guiding ducts 261, is preferred but not necessary. In particular, the flow guiding ducts 261 are made symmetrical to one another in shape and position.

As shown in the figures, the flow guiding ducts 261 can have elongated outlet openings which open into the opening 262 along the entire axial length of the flow guiding device 26. However, it can also be expedient for the flow guiding ducts 261 to open into the opening 262 only in certain areas, in order to produce a particularly suitable fluid flow. For example, the flow guiding ducts 261 can open into the opening 262 only in an end area of the flow guiding device 26 located downstream, in particular in the immediate vicinity of the valve opening of the first seat valve, in order to have a particularly good twist-producing action.

Figure 4:
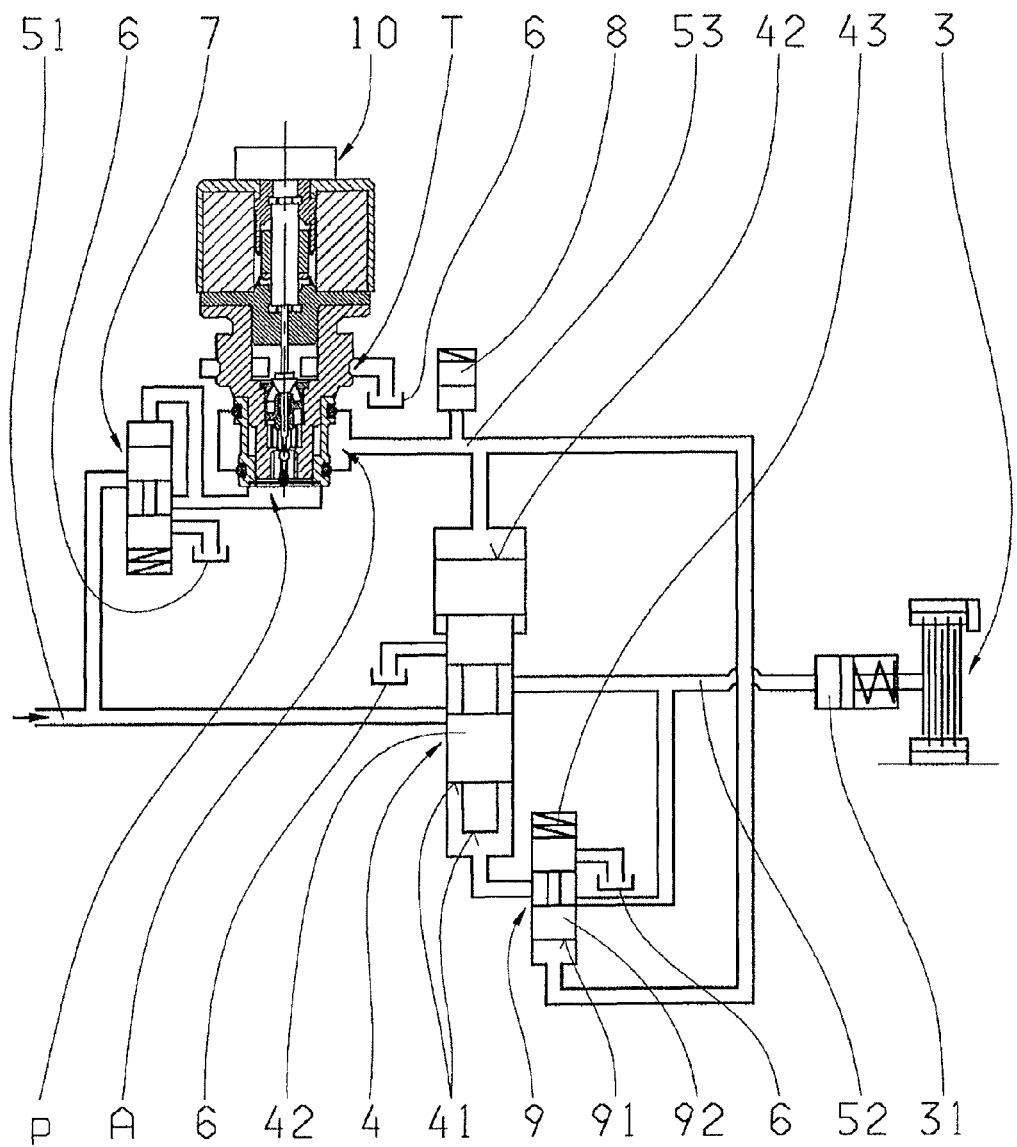
FIG. 4: A hydraulic fluid system for actuating a transmission shifting element of a vehicle.

FIG. 4 shows a hydraulic fluid system for actuating a transmission shifting element 3 of a vehicle, for example a one-stage or multi-stage vehicle transmission. The pressure-control valve device shown in FIG. 1 and indexed 10 in FIG. 4 serves for the hydraulic pilot control of a shifting element valve 4 which supplies the transmission shifting element 3 with a hydraulic shifting pressure. Thus, in FIG. 4 the pressure-control valve device is designed as a hydraulic pressure-control valve device. However, the pressure-control valve device can also be used for regulating the pressure of other fluids, in particular liquid fluids such as water or brake fluid. FIG. 4 serves only to illustrate a preferred application of the proposed pressure-control valve device, but other application possibilities are also conceivable. Accordingly, FIG. 4 is not to be regarded as having any limiting force.

The hydraulic fluid system has a feed line 51 which is supplied with hydraulic fluid pressurized to a main system pressure. For this, upstream from the feed line 51 there is a hydraulic pump (not shown), which draws the hydraulic fluid from a fluid reservoir 6. The feed line 51 divides into a first branch leading directly to the shifting element valve 4, and a second branch for the pilot control of the shifting element valve 4, which leads by way of a pressure-reducing valve 7 to the pressure-control valve device 10. From the shifting element valve 4 a shifting element line 52 leads on the one hand to a simply operating cylinder 31 of the shifting element 3, which actuates the shifting element 3 in this case consisting of a disk brake, in its closing or opening direction, by moving a piston rod out or in, while on the other hand the shifting element line 52 leads in the sense of a control line, via a holding valve 9, to a first axial control surface 41 of a valve slide 42 of the shifting element valve 4. In a known manner the pressure-reducing valve 7 in the second branch of the feed line 51 reduces the main system pressure to an inlet pressure delivered to the inlet area P of the pressure-control valve device 10. Any fluid bled off during this is returned to the reservoir 6 for re-use.

As described above the pressure-control valve device 10 regulates the inlet pressure as a function of the size of an electric current supplied thereto, to a pilot control pressure tapped off by a pilot control line 53 from the first outlet area A of the pressure-control valve device 10. The (leakage) fluid bled off during this via the second outlet area T of the pressure-control valve device 10 is also returned to the reservoir 6.

In the pilot pressure line 53 is arranged an elastically acting pressure damper 8, which reduces pressure fluctuations in the pilot control line 53 and displaces a resonance frequency of the fluid system to non-critical frequency ranges. Any residual pressure fluctuations in the inlet or first outlet areas A, P of the pressure-control valve device 10 are greatly attenuated or completely eliminated by the diameter ratio proposed according to the invention and the ratio of penetration depth to diameter, and where appropriate by the first flow guiding device. Because of this the size of the pressure damper 8 can be reduced or it can be omitted completely.

In the downstream direction the pilot control line 53 branches on the one hand into a line segment leading to a second axial control surface 43 of the valve slide 42 of the shifting element valve 4, and on the other hand into a line segment opening onto an axial control surface 91 of a valve slide 92 of the holding valve 9. Opposite the control surface 91 the holding valve 9 has an elastic element 93, in this case a compression spring, which with increasing displacement of the valve slide 92 produces an increasing force in opposition to the force of the pilot pressure applied on the control surface 91. Thus, the pressure applied on the second control surface 43 of the shifting element valve 4 can be adjusted directly by the pilot pressure, whereas the pressure applied on the first control surface 41 can be adjusted indirectly via the holding valve 9 by the pilot pressure. The second control surface 43 of the shifting element 4 is arranged on the valve slide 42 diametrically opposite the first control surface 41. Because of this the valve slide 42 is displaced by a resultant force between the control surfaces 41, 43, whereby the shifting pressure present in the shifting element line 52 and used for actuating the shifting element 3 can be adjusted as a function of the pilot pressure.

Alternatively the fluid system for actuating the shifting element 3 can also be designed as a fluid system with direct control instead of pilot control, and in that case the shifting element valve 4 is made in the same way as the pressure-control valve device 10. This allows the element 7, 9, 10, 53 needed for the pilot control to be omitted. However, the electric currents needed for actuating the shifting element valve 4 are then higher than in the fluid system with pilot control illustrated, so the electromagnet portion 1 of the shifting element valve 4 is made larger.

Needless to say, the transmission shifting element 3 can be of any other design desired, for example a multi-disk clutch, claw clutch or claw brake, if necessary with synchronization means as well, or as a single-disk clutch or a single-disk brake. The shifting element 3 is preferably used for engaging various gear steps in a multi-stage vehicle transmission or for coupling or decoupling vehicle transmission shafts, for example coupling or decoupling a transmission input shaft, a vehicle all-wheel shaft or a vehicle axle shaft.

Figure 5:
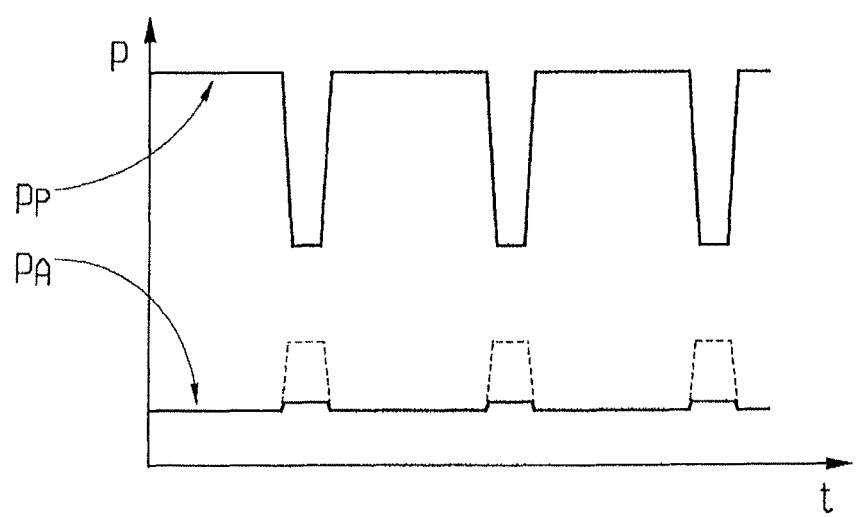
FIG. 5: A time variation of a pressure in the inlet area of a pressure-control valve device and a pressure in a first outlet area of the pressure-control valve device under the influence of pressure fluctuations in the inlet area.

FIG. 5 shows a schematic representation of a time variation of a pressure in the inlet area p of a pressure-control valve device, denoted by the index $p_P$, and of a pressure in the first outlet area A of the pressure-control valve device, denoted by the index $p_A$. In a known way the pressure (p) concerned is plotted on the ordinate axis while the time t is plotted along the abscissa. FIG. 5 is based on the comparison tests between a pressure-control valve device known from the prior art and the pressure-control valve device 10 designed according to the invention (see FIGS. 1 to 4), i.e. a pressure-control valve device with a diameter ratio $D_V/D_K$ larger than or equal to 0.75 and a penetration depth to diameter ratio $t/D_K$ larger than or equal to 0.2.

As shown in FIG. 4, the pressure $p_A$ is preferably used for the pilot control of a transmission shifting element 3. Since during this any pressure fluctuation of the pressure $p_A$ produces a reaction of the shifting element 3 and a corresponding counter-reaction of the transmission, for example a gearshift process, the pressure $p_A$ should undergo the least possible (undesired) fluctuations. Possible causes of pressure fluctuations in the pressure $p_A$ are fluctuations of the pressure $p_P$, for example caused by speed fluctuations of the hydraulic pump producing the pressure $p_P$ or the engagement or disengagement of other hydraulic consumers (for example the actuation of the pressure-control valve devices, multiplexer valves) arranged in the same hydraulic fluid system as the pressure-control valve device 10.

In FIG. 5 there occur, one after another in time, three pressure fluctuations of $p_p$ in the form of pressure falls which, in the outlet area A, produce the three shown pressure increases of $p_A$. During this the pressure-control valve device known from the prior art undergoes the pronounced pressure increases of $p_A$ represented by broken lines, whereas the pressure-control valve device 10 designed according to the invention shows the substantially flatter increases of $p_A$ represented by continuous lines. Accordingly, the pressure-control valve device 10 according to the invention is much less sensitive to pressure fluctuations than the known pressure-control valve device. Here, this means that the pressure fluctuations of $p_P$ are essentially not passed on downstream to affect $p_A$. Because of this the controllability of the shifting element 3 in FIG. 4 is increased considerably. Thus, other measures for damping pressure fluctuations, for example the pressure damper 8 shown in FIG. 4, can be omitted.

INDEXES

1 Electromagnet portion
10 Pressure-control valve device
11 Housing
13 Magnet yoke
131 Insertion recess
132 Magnet control edge
14 Armature
141 Armature rod
142 Armature body
143 Anti-sticking disk
15 Spring element
16 Pre-stressing element
17 Contacting device
18 Bearing
19 Pole tube
2 Valve portion
21 Housing
221 Filter
222 Plug
23, 24 Seat valve
231, 241 Closing element
232, 242 Valve aperture
233, 243 Valve control edge/Valve control surface
234, 244 Valve opening
235 Side of the valve aperture facing toward the inlet area P
236 Continuously tapering section
237 Continuously expanding section
238 Cylindrical section 25 Tappet rod
26, 28 Flow guiding device
261, 281 Flow guiding duct
262 Opening
27 Intermediate space
3 Shifting element
31 Cylinder
4 Switching element valve
42 Valve slide
41, 43 Control surface
51 Feed line
52 Shifting element line
53 Pilot control line
6 Tank
7 Pressure-reducing valve
8 Pressure damper
9 Holding valve
91 Control surface
92 Valve slide
93 Elastic element
A First outlet area (working pressure connection or area)
T Second outlet area (tank connection or area)
AA Section
B Width of a flow duct 261
P Inlet area (pressure supply connection or area)
S Section plane
ALPHA Opening angle
BETA Angle of valve control edge
$D_V$ Diameter of the valve opening 234
$D_K$ Diameter of the closing element 231
t Penetration depth of the spherical closing element 231
p Pressure

The invention claimed is:

1. A pressure-control valve device (10) for a fluid comprising at least one inlet area (P) and a first and a second outlet area (A, T), which are flow-connectable with one another by first and second seat valves (23, 24) being coupled to one another,
- a fluid inflow from the inlet area (P) to the first and the second outlet areas (A, T) being adjustable by the first seat valve (23) and a fluid outflow between the first and the second outlet areas (A, T) being adjustable by the second seat valve (24),
- the first seat valve (23) being formed as a valve aperture (232), with a valve opening (234) and a valve control edge (233) and a ball-shaped closing element (231) co-operating with the valve control edge (233),
- a ratio ($D_V/D_K$) of a diameter ($D_V$) of the valve opening (234) to a diameter ($D_K$) of the ball-shaped closing element (231) being equal to or greater than 0.75,
- an upstream flow guiding device (26), by which a twisting motion is imparted to incoming fluid in an area of the first seat valve (23), is arranged upstream of the first seat valve (23) in the inlet area (P), and
- a downstream flow guiding device (28) being arranged upstream of the second seat valve (24) and downstream of the first seat valve (23), along the flow between the first and the second outlet areas (A, T), and the downstream flow guiding device (28) is designed such that, in an area of the second flow valve (24), a twisting motion is imparted to the fluid flowing to the second outlet area (T).

2. The pressure-control valve device (10) according to claim 1 wherein a ratio ($t/D_K$) of a penetration depth (t) of the ball-shaped closing element (231), into the valve opening (234) in a closed condition of the first seat valve (23), to the diameter ($D_K$) of the ball-shaped closing element (231), is equal to or greater than 0.2.

3. The pressure-control valve device (10) according to claim 1, wherein a side (235, 236) of the valve aperture (232), facing toward the inlet area (P), is one of extends perpendicularly to a longitudinal axis (L) of the pressure-control valve device (10) or is formed with a continuous taper (236) in a direction of the valve control edge (233).

4. The pressure-control valve device (10) according to claim 1, wherein a cylindrical section (238) of the valve opening (234) is formed between an upstream area (236) thereof, that tapers continuously, and a downstream area (237) thereof that expands continuously.

5. The pressure-control valve device (10) according to claim 1, wherein the upstream and the downstream flow guiding devices (26, 28) are designed such that the twisting motions, of the fluid flow through the first and the second seat valves (23, 24), have a same rotational direction.

6. The pressure-control valve device (10) according to claim 1, wherein the upstream flow guiding device (26) has at least one flow guiding duct (261) which opens at least approximately tangentially to the valve opening (234) of the first seat valve (23), in the inlet area (P), and which extends downstream in a funnel shape, in a direction toward the valve opening (234) of the first seat valve (23).

7. The pressure-control valve device (10) according to claim 6, wherein a cross-section of the at least one flow guiding duct (261), in a plane which extends perpendicular to a longitudinal axis (L) of the pressure-control valve device (10), is propeller-shaped.

8. The pressure-control valve device (10) according to claim 1, wherein the ratio ($D_V/D_K$) of the diameter ($D_V$) of the valve opening (234) to the diameter ($D_K$) of the ball-shaped closing element (231) is between 0.75 and 0.8.

9. The pressure-control valve device (10) according to claim 1, wherein the ratio ($D_V/D_K$) of the diameter ($D_V$) of the valve opening (234) to the diameter ($D_K$) of the ball-shaped closing element (231) is 0.75.

10. A pressure-control valve device (10) for a fluid comprising at least one inlet area (P) and a first and a second outlet area (A, T), which are flow-connectable with one another by first and second seat valves (23, 24) being coupled to one another,
- a fluid inflow from the inlet area (P) to the first and the second outlet areas (A, T) being adjustable by the first seat valve (23) and a fluid outflow between the first and the second outlet areas (A, T) being adjustable by the second seat valve (24),
- the first seat valve (23) being formed as a valve aperture (232), with a valve opening (234) and a valve control edge (233), and a ball-shaped closing element (231) co-operating with the valve control edge (233),
- a ratio ($D_V/D_K$) of a diameter ($D_V$) of the valve opening (234) to a diameter ($D_K$) of the ball-shaped closing element (231) being equal to or greater than 0.75,
- a first flow guiding device (26), by which a twisting motion is imparted to incoming fluid in an area of the first seat valve (23), being arranged upstream of the first seat valve (23) in the inlet area (P),
- a second flow guiding device (28) being arranged upstream of the second seat valve (24), along the flow between the first and the second outlet areas (A, T), and the second flow guiding device (28) being designed such that, in an area of the second flow valve (24), a twisting motion is imparted to the fluid flowing to the second outlet area (T), and the first and the second flow guiding devices (26, 28) being designed such that the twisting motions, of the fluid flow through the first and the second seat valves (23, 24), have a same rotational direction.

11. The pressure-control valve device (10) according to claim 10, wherein the ratio ($D_V/D_K$) of the diameter ($D_V$) of the valve opening (234) to the diameter ($D_K$) of the ball-shaped closing element (231) is between 0.75 and 0.8.

* * * * *